United States Patent [19]
Nunley

[11] Patent Number: 5,269,570
[45] Date of Patent: Dec. 14, 1993

[54] FLEXIBLE CASING FOR WELL BOREHOLES

[76] Inventor: Dwight S. Nunley, 500 Oakwood Dr., Gretna, La. 70056

[21] Appl. No.: 686,668

[22] Filed: Apr. 17, 1991

[51] Int. Cl.⁵ .................... F16L 77/10; F16L 51/02
[52] U.S. Cl. .................... 285/229; 138/121; 285/226; 285/114
[58] Field of Search ........... 285/223, 226, 227, 228, 285/114, 299, 300, 302, 229; 166/242, 175; 175/320; 138/121

[56] References Cited

U.S. PATENT DOCUMENTS

| | | | |
|---|---|---|---|
| Re. 27,906 | 3/1970 | Toepper | 285/226 X |
| 389,525 | 2/1889 | McCloskey | 285/229 X |
| 1,094,323 | 4/1914 | Fulton | 285/226 X |
| 2,180,128 | 7/1937 | Stancliffe | 285/229 X |
| 2,352,038 | 3/1941 | Tölke | 285/229 |
| 2,449,369 | 9/1948 | Doque et al. | 138/121 |
| 2,770,259 | 7/1952 | Zallea | 285/229 X |
| 2,785,382 | 3/1957 | Lamb | 138/121 |
| 3,061,039 | 10/1962 | Peters | 285/229 |
| 3,263,446 | 8/1966 | Wiggins, Jr. | 138/121 |
| 3,318,335 | 5/1967 | Heller | 138/121 |
| 3,383,122 | 5/1968 | Richardson | 285/229 X |
| 3,416,819 | 12/1968 | Day | 285/302 |
| 3,514,600 | 5/1970 | Taylor | 138/121 |
| 3,550,639 | 12/1970 | Okuda | 138/121 |
| 4,147,185 | 4/1979 | Hines | 138/121 |
| 4,216,801 | 8/1980 | Aybian | 138/121 |
| 4,421,345 | 12/1983 | Ayers | 285/229 |
| 4,819,970 | 4/1989 | Umehara | 285/227 |

FOREIGN PATENT DOCUMENTS

| | | | |
|---|---|---|---|
| 1024824 | 4/1953 | France | 285/229 |
| 21085 | of 1902 | United Kingdom | 138/121 |

*Primary Examiner*—Eric K. Nicholson

[57] ABSTRACT

Tubulars for casing a well borehole which are drilled by high angle or horizontal drilling techniques. The tubulars contain an annularly disposed upset whose cross sectional shape is omega-like. This omega-like upset enables the tubulars to be set around the curved section of the borehole without detrimental buckling.

4 Claims, 2 Drawing Sheets

FLEXIBLE CASING FOR WELL BOREHOLES

FIELD OF THE INVENTION

The present invention relates to tubulars for casing well boreholes which were drilled by high angle or horizontal drilling techniques. The tubulars contain an annularly disposed upset whose cross sectional shape is omega-like. This omega-like upset enables the tubulars to be set around the curved section of the borehole without detrimental buckling.

BACKGROUND OF THE INVENTION

Recent advances in the art of drilling include the use of multiple high-angle development wells and directional and horizontal drilling techniques. High angle drilling techniques involve drilling a well into a discovered earth formation with the drillstring inclined at a substantial angle from vertical. Directional drilling involves drilling a first borehole leg, a transition zone, and a second borehole leg inclined at a substantial angle from the first borehole leg, so as to interpenetrate and exploit multiple oil-bearing sands from a single bore. For example, in horizontal drilling, a first leg may be vertical, and a second leg may be substantially horizontal, with a transition zone therebetween. The transition zone at which the two legs of the borehole meet may range from a gradual curve to an abrupt bend. The severity of the transition zone is measured in either bend radius or angle of inclination per horizontal distance. Thus, a transition zone or dogleg curving at 2°-6°/100 ft. (3000-1000 ft radius) is regarded as a "long radius" borehole, whereas a transition zone of 1.5°-3°/ft. (40-20 ft. radius) is regarded as a "short-radius" borehole.

High angle, directional and horizontal drilling of wells traversing earth formations offers promise as a way to increase production by changing the geometry of the well from primarily vertical to horizontal. For example, in some locations, such as the mid-field area of the Prudhoe Bay field, the oil column lies between an expanding gas cap and a water leg. Conventional wells begin producing gas and water early and continue with decreasing oil fractions throughout their life. Because the produced gas and water must be reinjected, the overall production rate of the field will soon be limited by the gas handling capacity. Thus, such wells rarely meet their potential with regard to hydrocarbon recovery and production rates. A horizontal completion, strategically placed between the gas cap and water leg, will offer the maximum standoff from both. The resulting benefits are increased production rates at lower drawdown pressures, and consequently, reduced gas and water coning.

Because there is such strong economic incentives to perfect high angle and horizontal drilling, much work is presently being done on such techniques. While horizontal drilling has met with some success, there are still drawbacks which must be considered. The nature of the transition zone of the well has a great deal of influence over the cost of the well and the technical problems associated with it. For example, while it is difficult, but economical, to drill and case a well with a curved section having a "long radius", it is often uneconomical to drill and case a "short radius" well. As the radius of curvature becomes smaller, the greater the difficulty and cost of drilling and casing. For example, conventional casing tubulars have a tendency to buckle in curved sections of boreholes. This makes it difficult for drillstring tools and production tubulars to be passed through the casing, or in severe buckling, for the well section, upstream, to be produced at all.

Thus, there exists a need in the art for improved techniques and equipment for enhancing the economic potentials of high angle and horizontal drilling.

SUMMARY OF THE INVENTION

In accordance with the present invention, there is provided borehole casing tubulars containing an annularly disposed upset feature having a cross-section which is omega-like in shape.

In a preferred embodiment of the present invention, the tubular is a connector for longer conventional lengths of tubulars and the annularly disposed upset is positioned 90° to the longitudinal axis of the tubular. The connector may be threaded at each end, welded, or any combination thereof.

In other preferred embodiments of the present invention, the upset runs spirally around the tubular.

In still other preferred embodiments of the present invention, the upset is internal to the outer surface of the tubular wall.

DETAILED DESCRIPTION OF THE INVENTION

Figure 1:
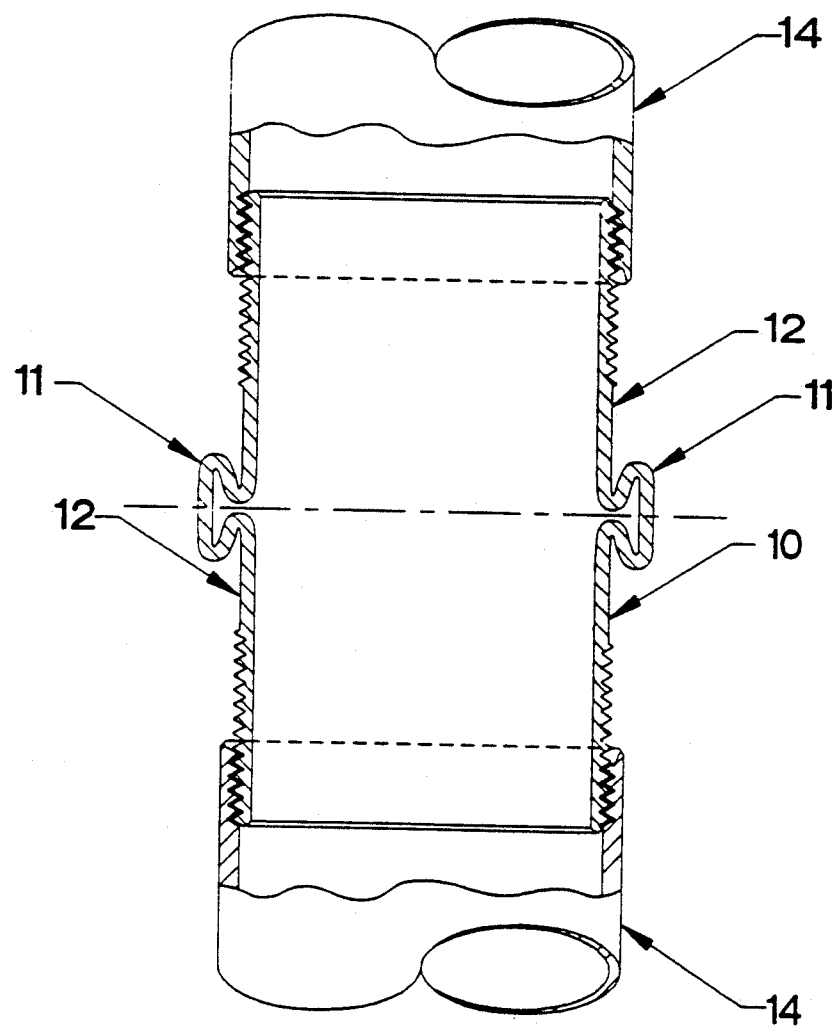
FIG. 1 depicts a casing connector of the present invention containing an external omega-like upset annularly disposed thereto. The connector is shown connected at both ends to a length of casing.

The tubulars of the present invention, which are suitable for use in high angle and horizontal boreholes, can be either entire sections of well casings of conventional lengths, or shorter length tubulars which serve as connectors for conventional length tublars. Conventional lengths generally run from about 29 to 32 feet. An omega-like upset, which forms a critical feature of the tubular wall, is incorporated into the tubulars, thereby giving them their high flex properties. Any appropriate technique can be used to form the upset. The preferred technique is by machine upsetting. The upset is shown in FIG. 1 hereof, which is a longitudinal cross-sectional view of a connector 10 of the present invention. The omega-like upset, which forms the critical feature of the tubular wall, can be positioned in the tubular 90° relative to the longitudinal axis of the tubular, and on its exterior, as shown in the figure. It can also be positioned helically around the tubular. It is preferred that it be 90° to the longitudinal axis of the tubular. The upset, from a cross-sectional view, is omega-like in shape with a continuously curved perimeter. That is, there are no sharp bends. That is, the shape is such that a length of the wave of the projecting portion A is larger than that of the recessed portion B formed on the surface of the tubular in a radial direction. This omega-like shape is important because it allows the casing to bend around a curved section of a borehole without detrimental buckling and without obstructing the inner bore of the casing for receiving drillstring tools. The connector of the figure has two threaded ends 12, which are threaded to lengths of casing 14. While it is preferred to use pipe threads to connect the connector to the lengths of casing, it is understood that any other suitable means, such as by welding, can also be used.

If the upset is internal to the tubular wall, a filler material can be inserted into the outside annular space. The filler material may be in the form of an O-ring comprised of a polymeric material, preferably an elastomeric material. By filling the annular space of the offset with a filler material, the string of casing can be more easily lowered down the borehole. Also, the filler material prevents small rocks from becoming trapped in the offset and inhibiting the tubular from flexing to its desired position.

As previously mentioned, the tubulars of the present invention can be either casing tubulars of conventional lengths in which the omega-like upset is incorporated at predetermined positions, or they can be connectors for joining longer casing tubular lengths. It is preferred that th e tubulars be connectors, as shown in FIG. 1 hereof. The size (length and diameter) of the connector will vary according to the diameter and wall thickness of the casing tubulars used, the radius of curvature of the borehole, and the like. For example, for shorter radius transition zones, the connectors will be longer than those used for "long radius" zones and the lengths of casing will be shorter so that the string of casing will be substantially tangential to the borehole at the transition zone.

Typically, the connectors of the present invention will be about 6 inches to 2 feet in length, depending of course on the diameter and length of casing tubulars to be connected. It is preferred that the connectors be metallurgically compatible with the tubular lengths to be connected and of substantially the same diameter and wall thickness. It is more preferred that the connectors be manufactured from the same alloy as the casing tubulars. Typical alloys for casing tubulars and their sizes and wall thickness are well known in the art. They are generally manufactured from various grades of steel to standards set forth by Standard American Petroleum Institute ("A.P.I."). The grades are related to the tensile strength of the steel from which the casing tubular is made. If metallurgical matching is impractical in any particular circumstance, then materials which is close in strength properties may be used.

Figure 2:
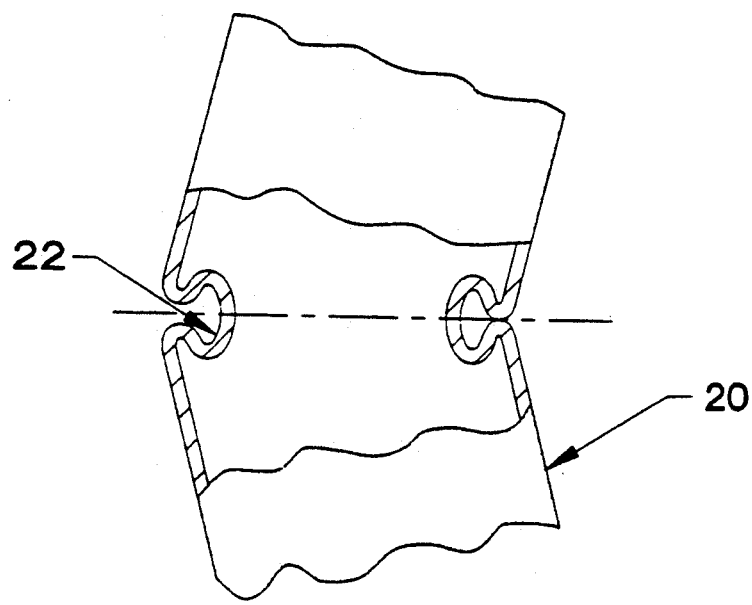
FIG. 2 hereof is a cut-away view of a casing tubular connector of the present invention in a flexed position showing the omega-like upset internal to the tubular wall.

FIG. 2 hereof is a cut-away longitudinal view of a casing tubular 20 of the present invention in a flexed position showing the omega-like upset 22 internal to the tubular wall.

Figure 3:
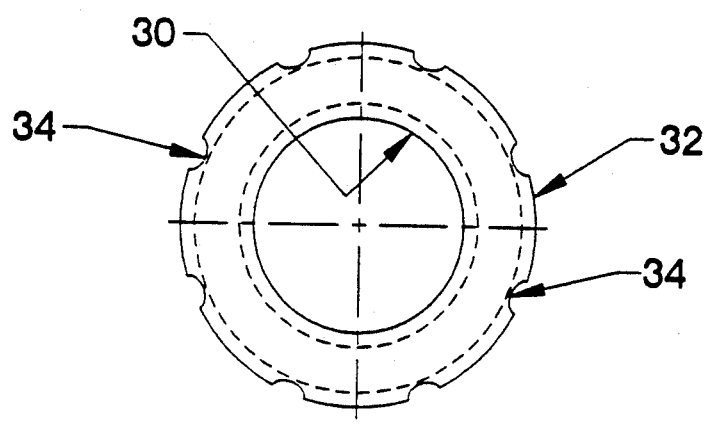
FIG. 3 hereof is a cross-sectional top view of a connector of the present invention showing longitudinal channels depressed on the surface of an external omega-like offset to allow for passage of drilling mud between the offset and the borehole wall. These longitudinal channels may also serve as a pathway for cement or formation fluids and gas after the casing string is set in its final position.

FIG. 3 hereof is a cross-sectional top view of a casing tubular 20 of the present invention showing the omega-like upset 32 external to the tubular wall. Longitudinally disposed grooves, or channels 34 are provided in the outside surface of the upset to allow for the passage of drilling mud cement or formation product between the upset and the wall of the borehole.

The principles of the present invention are also applicable to marine risers as well as borehole casing. A marine riser is a string of specially designed steel pipe that extends down from a drillship or offshore platform to the subsea wellhead. Marine risers are used to provide a return fluid-flow conductor between the wellbore and the drill vessel and to guide the drillstring to the wellhead on the ocean floor. The riser is made up of several sections, including flexible joints and a telescoping joint to absorb the vertical motion of the ship caused by wave action.

Various changes and/or modifications, such as will present themselves to those familiar with the art may be made in the method and apparatus described herein without departing from the spirit of this invention whose scope is commensurate with the following claims.

What is claimed is:

1. A flexible metal tubular casing for well boreholes which consists essentially of a tubular casing containing at least one annularly disposed upset having a cross-section which is omega-like in shape, which upset projects into the tubular wherein only the portion which projects into the tubular is filled with an elastomeric material.

2. The tubular of claim 1 wherein the annularly disposed upset is perpendicular to the longitudinal axis of the tubular.

3. A metal tubular for connecting two sections of casing tubulars for subterranean wells, which metal tubulars are characterized as consisting essentially of being threaded at both ends and containing at least one annularly disposed upset having a cross-section which is omega-like in shape which upset projects into the tubular and is filled with an elastomeric material.

4. The tubular of claim 3 where in the annularly disposed upset is perpendicular to the longitudinal axis of the tubular.

* * * * *